H. PEARL.
ADJUSTABLE CONTAINER FOR TEAPOTS.
APPLICATION FILED OCT. 29, 1921.
1,424,774.
Patented Aug. 8, 1922.
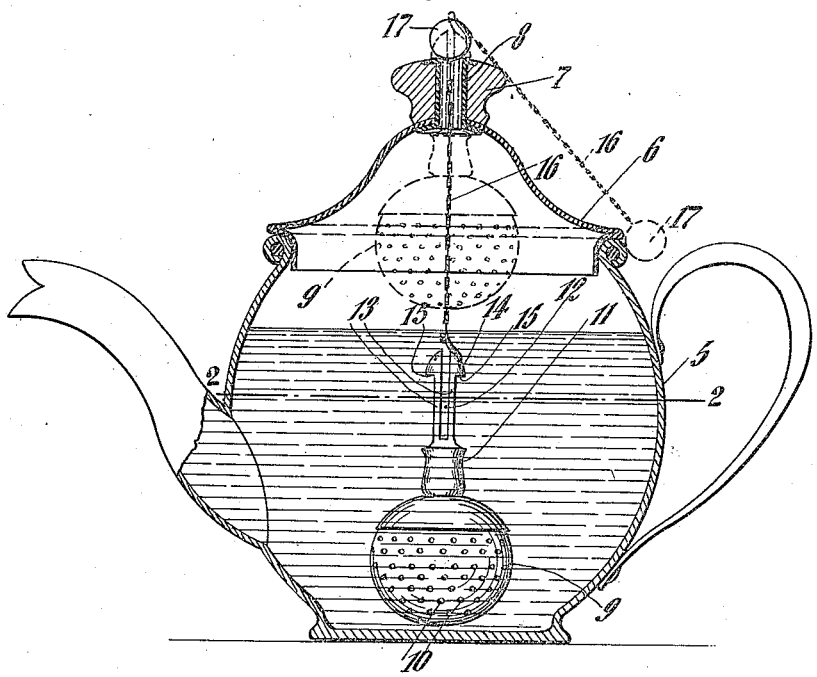
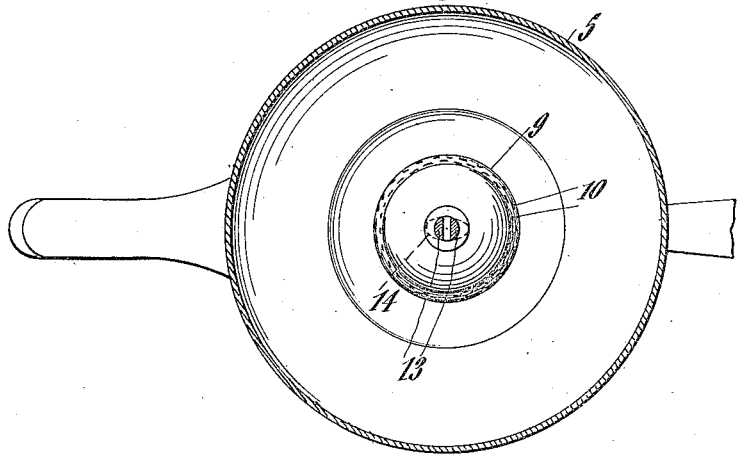
INVENTOR
Herman Pearl
BY C. P. Goepel
ATTORNEY

UNITED STATES PATENT OFFICE.

HERMAN PEARL, OF ELMIRA, NEW YORK.

ADJUSTABLE CONTAINER FOR TEAPOTS.

1,424,774.

Specification of Letters Patent. Patented Aug. 8, 1922.

Application filed October 29, 1921. Serial No. 511,319.

*To all whom it may concern:*

Be it known that I, HERMAN PEARL, a citizen of the United States, and resident of the city of Elmira, county of Chemung, and State of New York, have invented certain new and useful Improvements in Adjustable Containers for Teapots, of which the following is a description.

This invention relates to adjustable containers for tea pots and the like and has for its primary object to provide means whereby the tea ball may be suspended in the pot during the brewing of the beverage, and then raised to an elevated position and held in compact association with the lid or cover of the tea pot.

The invention further has for one of its objects to provide the tea ball with yieldable means to co-act with means on the tea pot cover to sustain the ball in its raised or elevated position, said yieldable means being capable of easy and quick release or detachment from the means on the cover when it is desired to again lower the tea ball into the liquor or beverage in the pot.

With the above and other objects in view, the invention consists in the improved form, construction and relative arrangement of the several parts as will be hereinafter more fully described, illustrated in the accompanying drawing and subsequently incorporated in the subjoined claims.

In the drawing wherein I have illustrated one preferable embodiment of the invention and in which similar reference characters designate corresponding parts throughout the several views:

Figure 1 is a vertical section view through a tea pot of conventional form showing my invention applied thereto and Figure 2 is a horizontal section taken on the line 2—2 of Figure 1.

Referring in detail to the drawing, 5 designates the body of the pot having a removable lid or cover 6. This cover at its center is provided with a suitable knob or finger piece 7 which is secured to the cover by means of a tubular thimble or sleeve 8, the opposite ends of which are open.

In the brewing of tea and similar beverages, it is customary to place the tea leaves in a sectional ball or container 9 which is perforated as at 10 so that the water contained in the pot may freely pass therethrough. This ball or container for the tea leaves may be of any desired size and capacity and one section thereof is provided with an axially disposed shank 11 having an open ended longitudinally extending slot 12 providing split or separated portions 13. These shank portions 13 are capable of a resilient lateral yielding movement with respect to each other and at their free ends each shank portion is provided with an enlargement or head 14 affording a shoulder 15.

To one of the heads 14 a chain or similar flexible element 16 is attached at one of its ends and said chain extends upwardly through the tubular sleeve or thimble 8 in the knob 7. To the other end of this chain a ball or equivalent finger piece 17 is attached.

In the use of the device the requisite quantity of water is placed in the pot 5 and after the tea leaves have been placed in the ball, the sections thereof are connected and the cover 6 then applied. Normally the ball is suspended by the chain 16 within the water and the weight of this ball serves to maintain the finger piece 17 in close engagement with the end of the thimble or sleeve 8 so that the orifice through this sleeve is securely closed. After the water has been brought to a boil and the tea submerged therein for the desired length of time, the finger piece 17 is grasped and the chain 16 pulled upwardly through the sleeve 8 thereby elevating the tea ball above the surface of the beverage. The split portion of the shank 11 is drawn through the sleeve 8 and the convex surfaces of the heads 14 striking the end of said sleeve cause the split portions of the shank to be forced towards each other. When the heads 14 are projected beyond the opposite end of the sleeve, said split portions of the shank immediately expand and the shoulders 15 engage over the end of the sleeve wall. Thus the tea ball is held in its raised or elevated position and is connected to the lid or cover 6. When the cover is removed the tea ball also is removed so that the pot may be replenished with water or additional tea leaves placed within the ball. It will also be seen that by reason of this close association of the tea ball with the cover, when the cover is removed and inverted, the liquid draining from the ball will be caught in the cover and the possible soiling of the table linen thus obviated.

From the foregoing description considered in connection with the accompanying drawing, the construction, manner of use and several advantages of the invention will be clearly understood. The device provides means for quickly and properly brewing tea or other beverages without necessitating the removal of the lid or cover from the pot after the brewing operation is completed. Such a device will, therefore, be found very serviceable and convenient and owing to its simple form and construction it is obvious that the invention may be manufactured and sold at comparatively small cost.

While I have herein shown and described a preferred form, construction and relative arrangement of the several parts, it is to be understood that the device is susceptible of many modifications therein, and I accordingly reserve the privilege of adopting all such legitimate changes as may be fairly embodied within the spirit and scope of the invention as claimed.

I claim:

1. In combination with a tea pot or the like having a cover provided with an opening, a foraminous container for the material to be submerged in the liquid in the pot, a flexible element for suspending said container disposed through the opening in the cover, and means adapted to be engaged through said opening, when the suspending element is drawn therethrough to elevate the container, to retain said container in its elevated position and in association with said cover, said means being constructed for disengagement from said cover by pressure exerted by the fingers laterally of said openings without elevation of said means.

2. In combination with a tea pot or the like, a cover therefor having a knob and an open ended sleeve securing said knob to the cover and having a flange extending radially from its upper edge above the knob, a foraminous container for the material to be submerged in the liquid in said pot, a split shank projecting axially from said container, a flexible suspending element connected at one of its ends to said shank, the split portions of said shank being adapted to be drawn through the said sleeve when the suspending element is pulled to elevate the container and being resiliently urged outwardly and said portions being formed with outwardly extending shoulders arranged to coact with the flange of said sleeve to maintain the container in its elevated position and in association with said cover.

3. In combination with a tea pot or the like and a cover therefor having a knob, an open ended sleeve securing said knob to the cover wall and having a flange extending radially from its upper edge above the knob, a foraminous container for the tea leaves, a longitudinally split shank projecting axially from the container, the split portions of the shank terminating in heads providing outwardly extending shoulders thereon and said split portions being yieldingly movable towards and from each other, a flexible suspending element connected at one of its ends to one of the split portions of the shank, and a finger piece connected to the other end of said suspending element and constituting a closure for the upper open end of said sleeve when the container is suspended within the pot, said split portions of the shank being adapted to be drawn through said sleeve and the heads thereof co-acting with the sleeve wall on upward movement of the container to urge said split portions towards each other, said split portions expanding when the heads thereof are projected beyond the end of the sleeve to engage said shoulders over the flange of the sleeve thereby sustaining the tea ball in its elevated position and in association with said cover, but permitting the tea ball to be lowered from the cover by pressure on said split portions laterally of said sleeve without preliminary raising of the suspending element or said shank.

In testimony that I claim the foregoing as my invention, I have signed my name hereunder.

HERMAN PEARL.